United States Patent [19]

Morin

[11] 4,401,088

[45] Aug. 30, 1983

[54] BUILT-IN HYDRAULIC AUTOMATIC DEVICE FOR ADVANCING THE INJECTION OF A DIESEL ENGINE

[75] Inventor: René Morin, Pelussin, France

[73] Assignee: Renault Vehicules Industriels, Rhone, France

[21] Appl. No.: 107,882

[22] Filed: Dec. 28, 1979

[30] Foreign Application Priority Data

Dec. 29, 1978 [FR] France ............................... 78 37109

[51] Int. Cl.[3] ......................... F16D 5/00; F02M 59/20

[52] U.S. Cl. ........................................ 123/502; 464/2; 464/5

[58] Field of Search ............... 123/502, 501, 500, 418, 123/419, 420; 64/25, 24; 417/294, 462; 464/2, 5

[56] References Cited

U.S. PATENT DOCUMENTS 3,650,125 3/1972 Phillips .................................. 64/25

3,774,411 11/1973 Phillips .................................. 64/25

FOREIGN PATENT DOCUMENTS 491336 3/1954 Italy ....................................... 64/25

*Primary Examiner*—Ira S. Lazarus
*Assistant Examiner*—Carl Stuart Miller
*Attorney, Agent, or Firm*—Remy J. VanOphem

[57] ABSTRACT

The invention concerns a hydraulic automatic device for the injection advance of a diesel engine. The device comprises a hub fixed to the pump camshaft and a casing fixed to the drive pinion of the pump. Two rollers in the casing bear on the ramps of pistons of which the position is a function of the speed of rotation, owing to two inertia blocks, the thrust of the pistons and the control of the slide valve of a hydraulic distributor. Thus, at each speed of rotation, there corresponds a certain angular displacement of the components and a certain advance of the injections.

10 Claims, 12 Drawing Figures

BUILT-IN HYDRAULIC AUTOMATIC DEVICE FOR ADVANCING THE INJECTION OF A DIESEL ENGINE

FIELD OF THE INVENTION

The present invention concerns a built-in automatic device for the hydraulic advance of a diesel engine injection pump.

BACKGROUND OF THE INVENTION

On a diesel engine, it is known that high drive forces must be applied to the crankshaft of the fuel injection pump. These forces are significantly greater when large modern diesel engines are fitted to industrial vehicles. However, it is essential to introduce a variable angular displacement into the drive transmission of the injection pump shaft, this variation having to take into account the momentary operating conditions of the engine in order to carry out the control of the injection advance.

Mechanical automatic devices for controlling the injection advance are known. These devices do not stand up well to high drive forces and therefore are falling out of use in the case of large diesel engines.

Several types of hydraulic automatic devices for controlling the injection advance are known, and these do not have the disadvantage of the mechanical devices. The hydraulic devices are generally found in the form of a coupling sleeve, and are in all cases bulky and complicated. These devices are more costly in that they complicate the fitting of the injection pump.

SUMMARY OF THE INVENTION

The invention aims at achieving a hydraulic automatic device for the injection advance which allows injection pumps known as "flanged" to be fitted, that is to say, injection pumps which fit directly to the engine by means of a mounting flange, the pump shaft drive being made directly, through, for example, a conical sleeve, and without the intervention of a coupling sleeve.

The invention aims at achieving a device of the aforementioned type which may be incorporated in a drive system constituted, for example, by a gear in the timing case of the diesel engine, this gear engaging with another gear mounted on the camshaft or on the crankshaft of the diesel engine.

The invention has therefore the aim of achieving a device of the aforementioned type which may be built into the diesel engine and housed inside the timing case of the engine.

The hydraulic automatic device for injection advance according to the present invention, mainly for the injection pump of a diesel engine, is constituted by a revolving assembly co-axial with the camshaft of the injection pump and it is characterized in that it includes:

a hub fixed to the injection pump camshaft;

a casing which is fixed to the drive pinion of the injection pump, which surrounds the hub, and which carries internally at least one roller parallel to the axis of the casing but situated away from this axis;

in connection with each roller of the casing, a piston of which the axis is at right angles to the axis of the device, each piston being fitted to slide in a blind boring in the hub and including a lateral bearing ramp which acts with the corresponding roller of the casing;

a hydraulic circuit including within the hub at least one distributor of which the slide valve is operated by an eccentric inertia block which is able to move mainly under the action of centrifugal force, this distributor regulating the pressure in the chambers defined behind the pistons.

According to an additional characteristic of the invention, the device includes at least one spring which acts between the hub and the casing to hold each roller of the casing against the ramp of the corresponding piston.

According to an additional characteristic of the invention, the ramp of each piston is located near the front of the piston and slopes towards the axis of the piston, towards its front. This ramp is in addition, sufficiently inclined in relation to a transverse plane of the piston for the transmission of movement between the piston and the roller to be irreversible, that is to say, so that the piston cannot slide under the action of the thrust of the roller, no matter how strong it may be.

According to an additional characteristic of the invention, the inertia block which operates the slide valve is subject to the action of one of the pistons in the hub by means of a coil spring which is co-axial with the piston and which is compressed between the piston and the inertia block. The axis of the piston and the axis of the slide valve are parallel and lay on opposite sides of the pivot in the hub on which the inertia block is fitted so as to swing. The pivot itself is parallel to the axis of the device.

According to an additional characteristic of the invention, the main axis of the inertia block is substantially perpendicular to the axis of the piston which acts on the inertia block.

According to an additional characteristic of the invention, the front face of the piston acting on the inertia block is tilted towards the inertia block, and the hydraulic distributor is arranged so as to cause the pressure in the chamber defined behind the piston to increase when the inertia block moves away from the distributor, the pivot on which the inertia block swings extending between the axis of the piston and the center of gravity of the inertia block.

According to an additional characteristic of the invention, the rear chamber of each piston is permanently connected to a feed of fluid under pressure, as well as to a fluid escape orifice which the slide valve can block progressively when the inertia block moves away from the distributor.

According to an additional characteristic of the invention, the feed of fluid under pressure comprises a revolving seal fitted to one end of the hub.

According to an additional characteristic of the invention, the device comprises two diametrically opposite inertia blocks of which only one is connected with the distributor slide valve.

BRIEF DESCRIPTION OF THE DRAWINGS

The attached drawings given by way of non-limiting example, will allow the characteristics of the invention to be better understood.

DESCRIPTION OF THE PREFERRED EMBODIMENT

Figure 2:
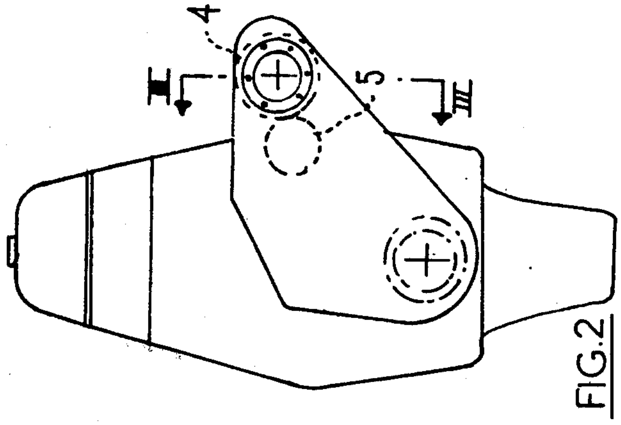
FIG. 2 is a front view of the diesel engine of FIG. 1.
Figure 1:
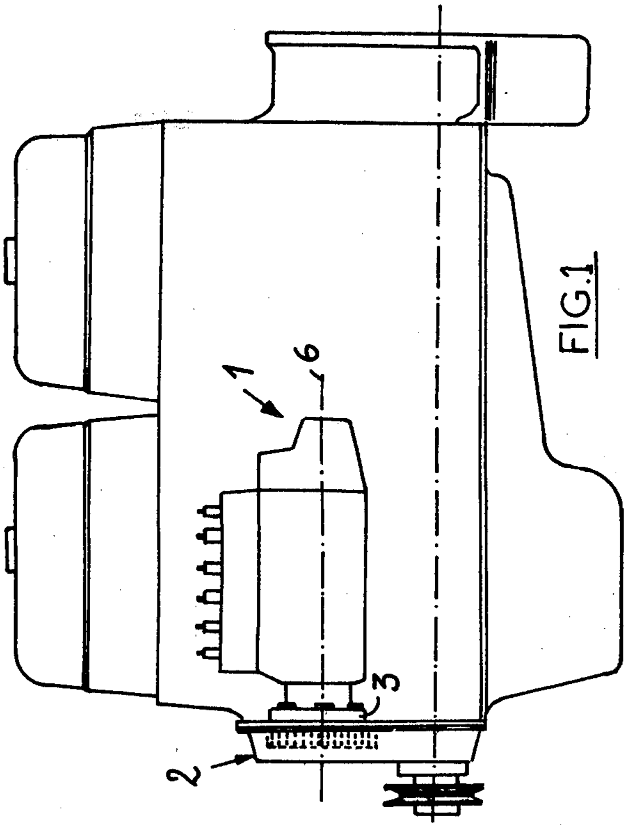
FIG. 1 is a side view of a diesel engine fitted with a hydraulic automatic device for advancing the injection according to the invention.

There is shown in FIG. 1, in a simplified way, a diesel engine fitted with a device according to the invention. A six cylinder engine fitted with an injection pump 1 and a timing case 2 is shown. The pump 1 is known as "flanged", which means that it carries a circular fixing flange 3 by means of which it is attached to the engine. This attachment is carried out directly, without the intervention of a coupling sleeve. A drive pinion 4 of the pump 1 camshaft is located inside the timing case 2, this drive pinion 4 engages a pinion 5 driven by the crankshaft of the engine (FIG. 2).

The device according to the invention is constituted by a compact revolving assembly of which the axis 6 is coaxial with the axis of the camshaft of the pump 1. This device comprises mainly on the one hand a hub 7 which is fixed to the camshaft of the pump, and on the other hand a casing 8 which is attached to the pinion 4 (see FIGS. 3 to 8).

The casing 8, which encloses the hub 7, carries internally two rollers 9 and 10 which are diametrically opposite, parallel to the axis 6, and situated some distance from the axis 6.

The rollers 9 and 10 are associated with, respectively, the pistons 11 and 12. The axes of the pistons 11 and 12 are at right angles to the axis 6. The pistons 11 and 12 have a lateral bearing ramp 13 and 14 respectively which works in conjunction with the rollers 9 and 10 respectively. The rollers 9 and 10 are mounted to slide in a blind bore in the hub 7. The ramps 13 and 14 are sufficiently inclined in relation to a transverse plane through the corresponding pistons for the transmission of movement between the pistons and the rollers to be irreversible, that is to say, so that the pistons cannot slide under the action of the thrust of the rollers no matter how strong the thrust may be.

Pressure chambers 15 and 16 are formed behind the pistons 11 and 12 and are in communication with an annular passage 17 into which is fed a fluid under pressure. This feed comprises a revolving seal 18 fitted on one end of the hub 7, a calibrated radial hole 19 drilled into the hub 7, and a pipe 20 for delivering fluid under pressure (not shown), as well as a channel 21 which extends longitudinally into the hub 7 between the hole 19 and the annular passage 17.

Figure 6:
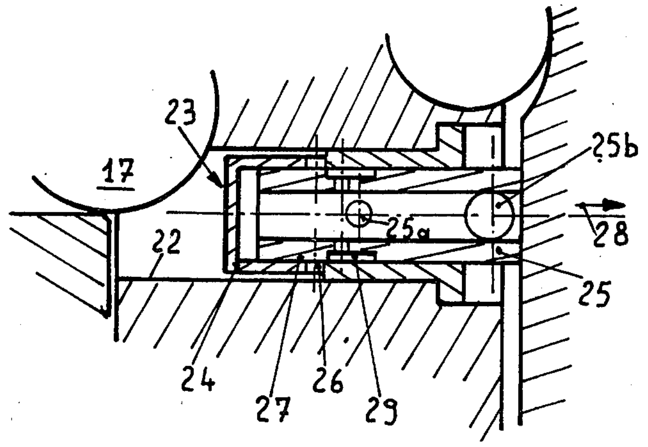
FIG. 6 is an enlarged portion of FIG. 5 showing the hydraulic distributor of the device.

The annular passage 17 likewise communicates with a bore 22 which is parallel to the pistons 11 and 12 in the hub 7, and enclosing a distributor 23 comprising a fixed cap 24 and a slide valve 25 (FIG. 6). The cap 24 has radial openings 26 which may either be blocked by a cylindrical rear extension 27 of the slide valve 25, when this slide valve moves forward in the direction of the arrow 28, or open into an annular throat 29 in the slide valve when the latter moves rearward. Since the slide valve 25 is tubular, with radial openings 25*a* and 25*b* which open on the one hand into the throat 29 and on the other to the outside at the front of the cap 24, the throat 29 is always connected to the outlet. The hydraulic fluid which escapes simply falls back into the timing case 2.

Finally the device comprises two inertia blocks 30 and 31 which are diametrically opposite each other and have main axes which are substantially perpendicular to the axes of the pistons 11 and 12. The inertia block 30, which is under the action of the piston 11, is mounted to swing about a pivot 32 in the hub 7. The pivot 32 is parallel to the axis of the device. A coil spring 33, coaxial with the piston 11, is compressed between one end of the inertia block 30 and the bottom of a blind bore 34 hollowed in the piston 11. The other end of the inertia block 30 is able to push the front face of the slide valve 25 backwards. The axis of the piston 11 and the axis of the slide valve 25 lie on opposite sides of the pivot 32. The center of gravity of the inertia block 30 on the other hand lies between the pivot 32 and the geometrical axis of the slide valve 25. The inertia block 31, which is subject in a similar way to the action of the piston 12, is mounted in an identical manner to the inertia block 30. The inertia block 31 is not in contact with any slide valve, unlike the inertia block 30, but the unbalance caused by this dissymmetry is entirely negligible. Taking account of the very small mass of the slide valve 25, in relation to the mass of the inertia block 30, the centrifugal force acting on this slide valve is insignificant, and need not be taken into account in the operation of the device.

Figure 4:
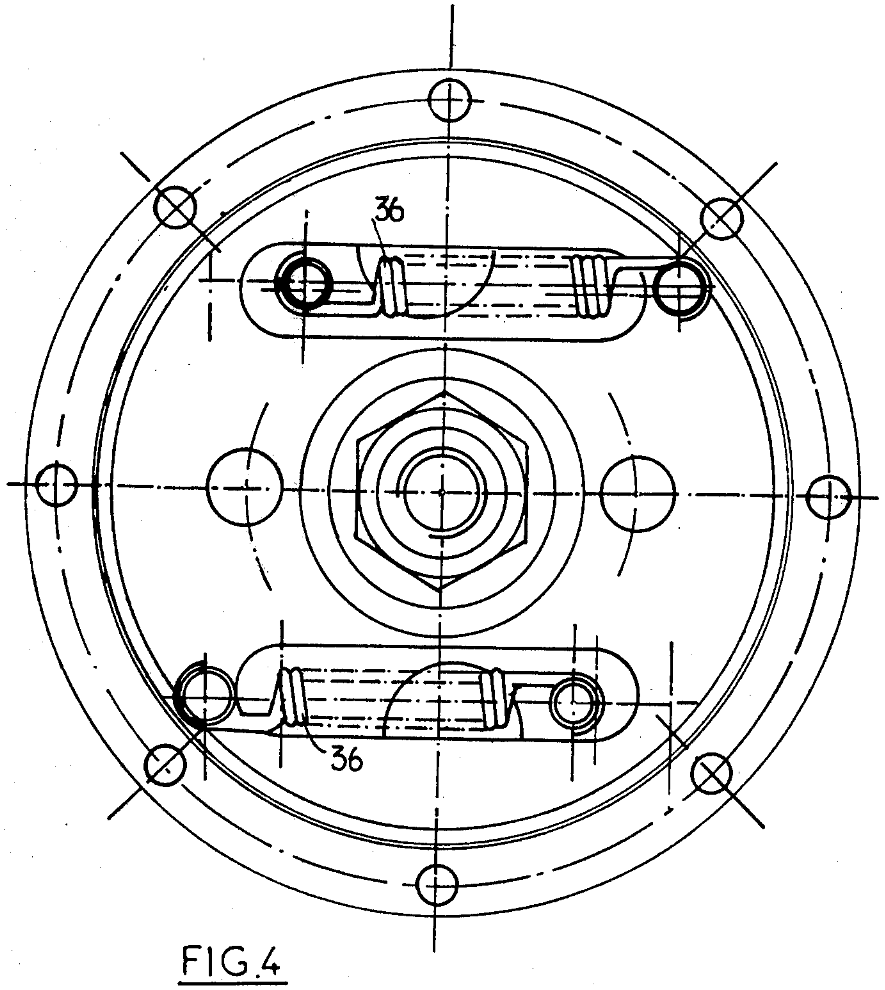
FIG. 4 is a front view of the device according to the invention.
Figure 5:
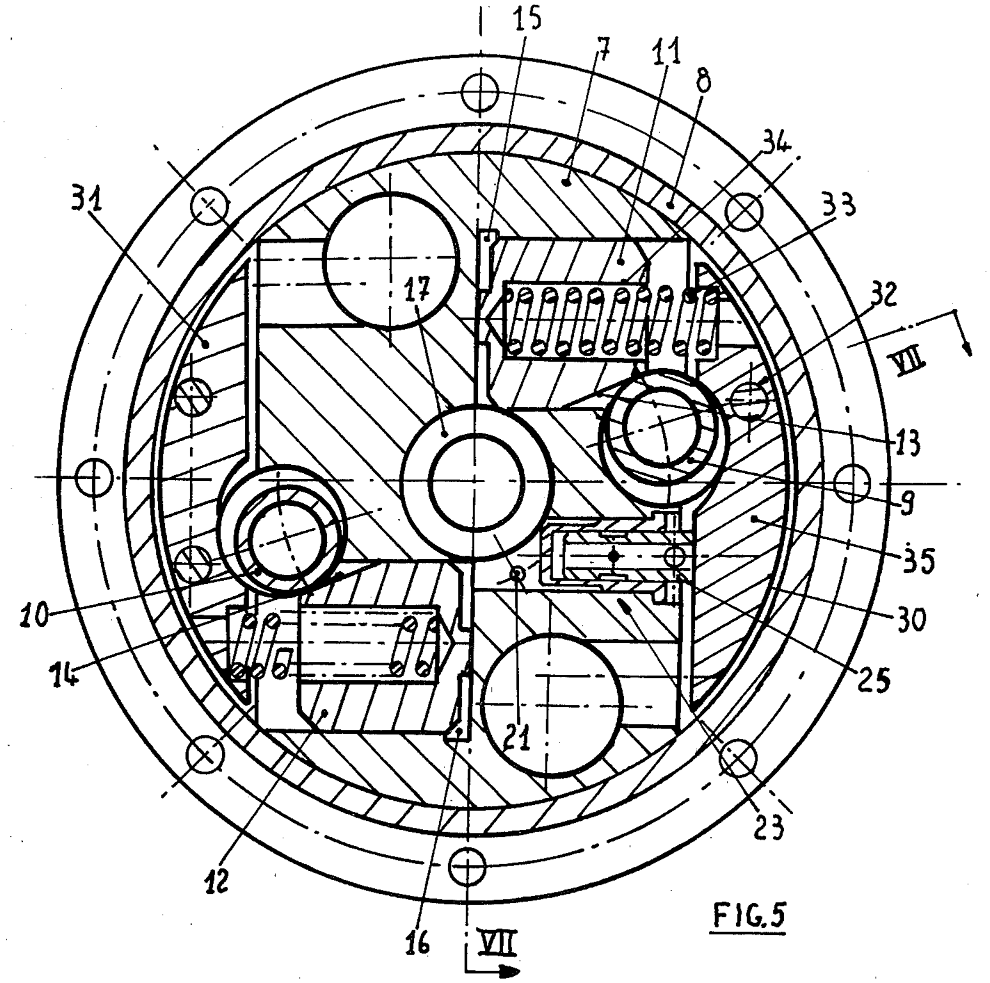
FIG. 5 is a section view along lines V—V of FIG. 7.

Two return springs 36 are permanently stretched between the hub and the casing, on the front of the device as shown in FIG. 4, to hold the rollers 9 and 10 so as to be constantly bearing against the ramps 13 and 14.

Figure 9:
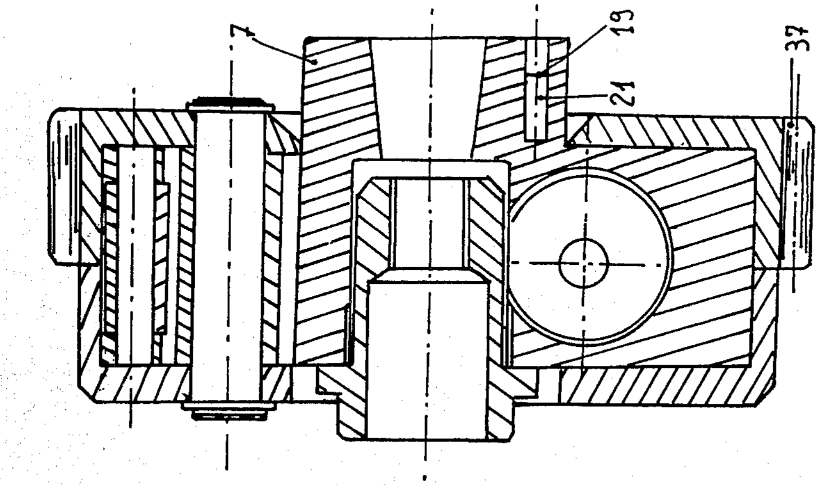
FIGS. 9 and 10 are views corresponding, respectively, to FIGS. 7 and 8, showing a manufacturing variant of the device according to the invention.
Figure 8:
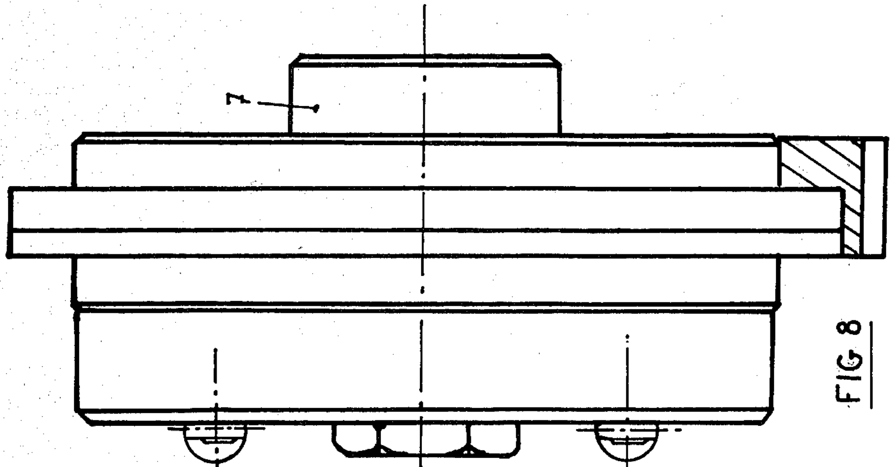
FIG. 8 is a side view of the device according to the invention.
Figure 7:
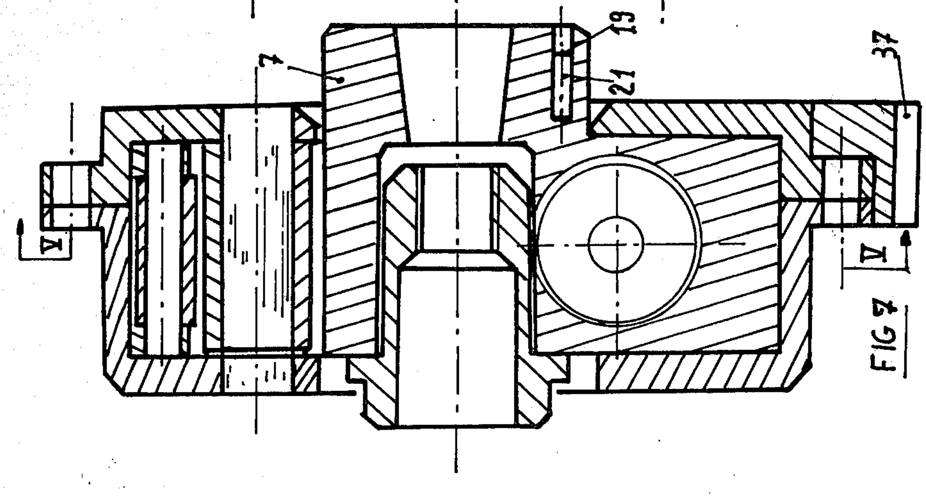
FIG. 7 is a section view along lines VII—VII of FIG. 5.
Figure 10:
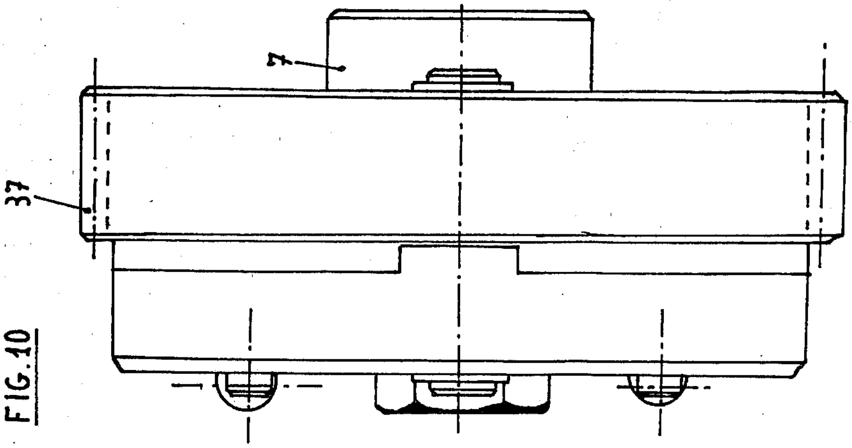

It will be seen that the device is compact and is built into a drive pinion 4. This pinion may be fitted with a toothed ring or teeth 37 applied to the periphery of the casing 8 (see FIGS. 7 and 8), but the teeth 37 may also be cut directly on the outside of the casing 8 (FIGS. 9 and 10).

Figure 3:
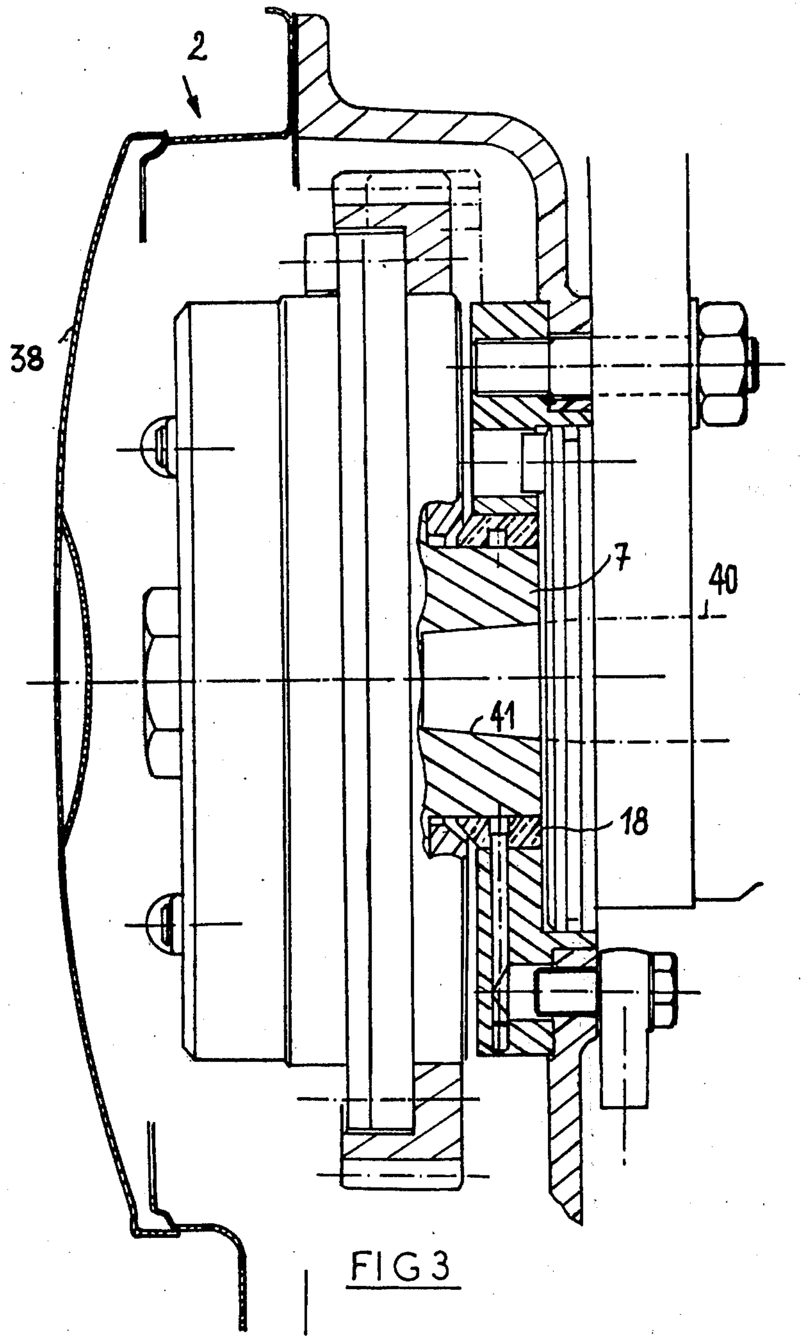
FIG. 3 is a section view along lines III—III of FIG. 2 in which the engine is shown only close to the device according to the invention.

FIG. 3 shows the simplicity of assembling the device and its maintenance: by removing an inspection cover 38 in the timing case 2 there is immediate access to the entire device and to a locking bolt 39 by means of which the camshaft 40 of the pump 1 is locked onto the hub 7. The camshaft 40 is fixed in this hub by means of a conical sleeve 41.

the operation is as follows:

When the system is at rest, that is to say, when centrifugal forces have not acted on the inertia blocks 30 and 31, the latter are subjected only to the action of the springs 33. Thus, taking account of the position of the extreme swing in which the inertia block 30 is held, the slide valve 25 is pressed inwards and the distributor connects the pressure chambers 15 and 16 to the outlet. The pistons 11 and 12 remain at rest.

Figure 11:
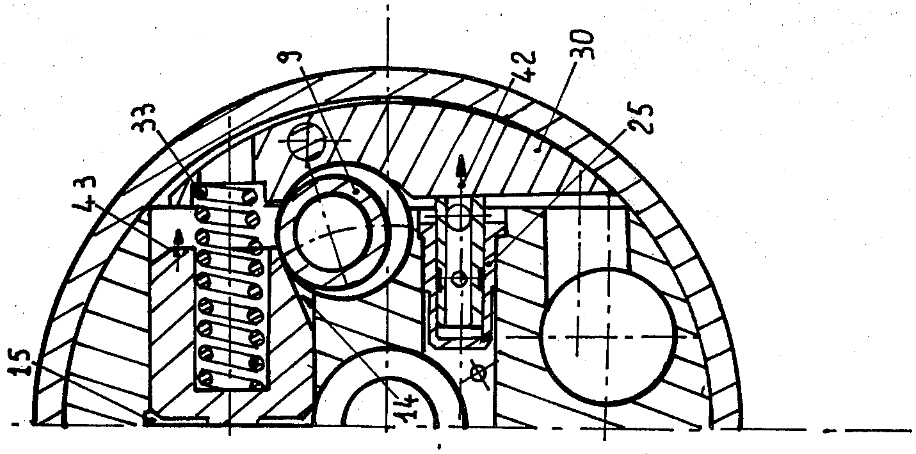

After a certain speed of rotation of the drive pinion 4 is reached, the inertia blocks 30 and 31 move outward under the effect of centrifugal force (FIG. 11), and the freed slide valve moves outwards (arrow 42), which causes the pressure in the chambers 15 and 16 to rise.

Immediately the two pistons 11 and 12 move forward (arrow 43), which has the consequences of:

creating a certain angular displacement between the hub and the casing, since the rollers 9 and 10 "climb" the ramps 13 and 14 of the pistons; and increasing the compression in the springs 33.

Figure 12:
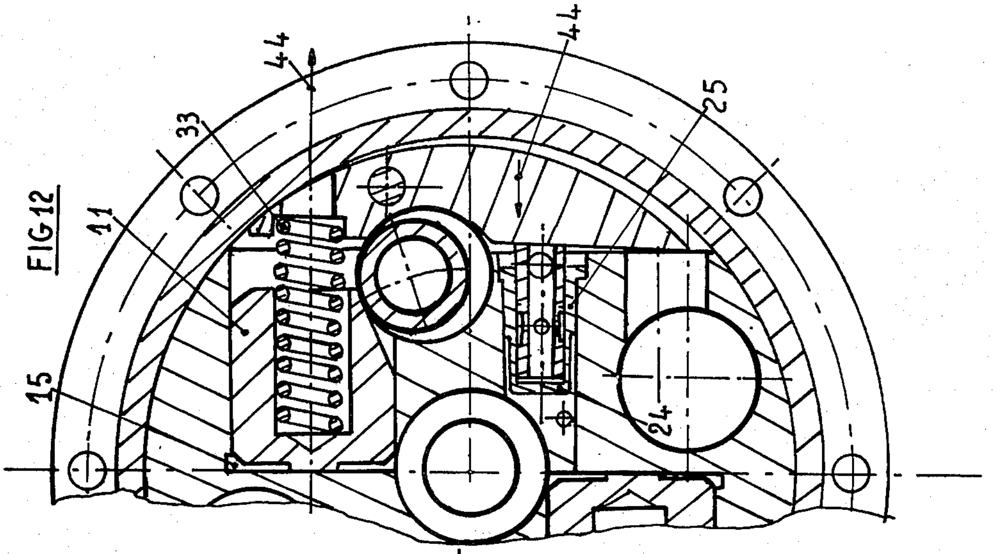
FIGS. 11 and 12 are part diagrammatic views corresponding to FIG. 5 and showing the operation of the device.

The springs 33 oppose the centrifugal force by bringing the center of gravity of the inertia blocks back inwards (FIG. 12, arrows 44). The inertia blocks 30 and 31 then return to their starting positions, inertia block 30 pressing the slide valve 25 into the cap 24 and making the fluid pressure in the chambers 15 and 16 fall once more.

In fact, a balance is rapidly reached between the oil pressure in the chambers 15 and 16, the tension of the springs 33, and centrifugal force. The establishment of this balance causes immobilization of the pistons 11 and 12 at an intermediate point in their sliding movement, that is to say, at a certain angular displacement between the hub 7 and the casing 8. Thus at each speed of rotation, there corresponds a certain angular displacement of the components and a certain advance of the injection.

It will be seen that it is possible to establish a relationship or law giving the value of the angular displacement in relation to the travel of the pistons by varying the profile of the ramps 13 and 14. This allows the size of the error of position of the pistons in relation to their travel to be reduced.

It is possible to modify the law for injection advance by changing the stiffness of the springs 33. By changing the initial calibration of the springs 33, the beginning of the development of injection advance is modified.

The straight ramps 13 and 14 may also be replaced by ramps which allow a law of advance to be obtained which is not directly proportional to the speed of rotation of the pump camshaft.

The device according to the invention has the following main advantages.

The hydraulic and mechanical arrangement allows the pistons to be moved by a pressure of oil which is in relation to the speed of rotation is such that the operation is simple and free from oscillation phenomena or risk of breakdown. In particular, no use is made of small springs which are vary fragile and difficult to calibrate.

The angular indexing obtained is both precise and stable in relation to the speed of rotation.

owing to the operation being irreversible the force component acting on the pistons and arising from the high and irregular drive couple of the injection pump is not able to move the pistons, 11 and 12. This allows great stability of operation to be obtained. In particular, it is useless to close the hydraulic circuit after each movement of the pistons 11, 12, the latter having no need to remain supported by a hydraulic cushion since the control is irreversible.

The operation is very progressive and free from oscillations such as those due to repeated opening and closing of a slide valve.

The fluid under pressure used is advantageously, but not necessarily, the lubrication oil of the engine. From the point of view of the dependability of operation, the oil-tightness is not of paramount importance, from the fact that the device is located inside the timing case of the engine. All leaks are automatically collected.

The injection pump is fixed in cantilever, by means of the fixing flange. This particularly simple and practical mounting reduces the bulk of the assembly, and avoids the use of any other fixing device of the pump to the engine block.

What I claim is:

1. An automatic hydraulic fluid device for advancing the fuel injection pump of a diesel engine in response to engine speed, said engine having a drive pinion and injection pump having a camshaft, with a central axis, said device comprising:

a hub member coaxially mounted to the camshaft of the injection pump for rotation therewith, said hub having portions defining at least one cavity with a central axis oriented perpendicular to the central axis of the camshaft, at least one passage communicating with said at least one cavity, an annular passage centrally located in said hub member and a second cavity with a central axis parallel to said central axis of said at least one cavity and further communicating with said annular passage, said at least one passage having an inlet and an outlet;

a casing member mounted to the drive pinion for rotation therewith;

at least one roller member connected to said casing member, said at least one roller member having an axis oriented parallel but spaced away from the central axis of the camshaft and further being mounted within said at least one passage, said at least one roller member having an outer diameter smaller than said inner diameter of said at least one passage to permit relative movement of said casing member to said hub member;

at least one piston member slidably mounted within said at least one cavity, said at least one piston member having a front face; a rear face opposite to said front face; a biasing ramp on the periphery of said at least one piston member adjacent to said front face; and a central axis projecting from said rear face to said front face, said biasing ramp of said at least one piston member further being located contiguous to said at least one roller member for cooperative engagement therewith, said rear face of said at least one piston member and the bottom of said at least one cavity defining at least one pressure chamber; and means, mounted in said second cavity, for supplying pressurized fluid to said at least one pressure chamber in response to the drive pinion gear rotational speed such that above a predetermined rotational speed of said drive pinion, the pressurized fluid in said at least one pressure chamber forces said at least one piston member in said at least one cavity to move outward from said axis of the camshaft toward said casing member whereby said biasing ramp of said piston member moves against said at least one roller member to move said hub member relative to said casing member to cause an angular displacement therebetween in order to advance the fuel injection pump of said diesel engine.

2. An automatic hydraulic fluid device as claimed in claim 1 further comprising:

at least one biasing member connecting said hub member to said casing member, said biasing member further biasing said biasing ramp of said at least one piston member in engagement with said at least one roller member.

3. An automatic hydraulic fluid device as claimed in claim 1 wherein said piston member further comprises portions defining a blind bore centrally located with said central axis from said front face toward said rear face, and wherein said biasing ramp further being inclined relative to said central axis of said piston member from said front face toward said rear face so that said piston member slides relative to said rollers.

4. An automatic hydraulic fluid device as claimed in claim 3 wherein said means for supplying pressurized fluid further comprises:

a distributor member mounted in said second cavity in said hub member;

at least one pivot pin member mounted to said hub member, said pivot pin member further being mounted parallel to but spaced away from said at least one roller member and perpendicular to said central axis of said at least one piston member;

at least one inertia block member pivotally mounted to said pivot pin member, said at least one inertia block member having one end portion and another end portion mounted contiguously to said one end portion, said one end portion operatively engaging said at least one piston member, said another end portion operatively engaging said distributor member;

means for connecting said annular passage with said at least one cavity, for flow communication therebetween;

a spring member interposed said at least one piston member and said one end portion of said at least one inertia block member; and means for supplying fluid under pressure to said annular passage.

5. An automatic hydraulic fluid device as claimed in claim 4 wherein said one end portion of said at least one inertia block member further has a first flat portion perpendicular to the axis of said at least one piston member.

6. An automatic hydraulic fluid device as claimed in claim 5 wherein said distributor member further comprises:

a cap member pendantly mounted within said second cavity, said cap member having an open end, a closed end opposite said open end, a central aperture extending from said open end toward said closed end and portions defining a plurality of radial holes between said open end and said closed end for flow communication between said central aperture and said second cavity; and a tubular slide member slidably mounted within said central aperture of said cap member, said tubular slide member further being mounted adjacent to said another end portion of said at least one inertia block, said tubular slide member having an inlet, an outlet opposite said inlet, portions defining a central channel extending from said inlet to said outlet, a plurality of radial openings adjacent to said inlet for flow communication with said plurality of radial openings in said cap member, said tubular slide member further being slidable within said cap member so that in a first predetermined position, said tubular slide member prevents fluid flow communication between said annular passage and said outlet, thereby increasing the fluid pressure in said pressure chamber and so that in a second predetermined position, said tubular slide member permits fluid flow communication between said annular passage and said outlet through said plurality of radial openings of said tubular slide member and said plurality of radial openings in said cap member thereby reducing the fluid pressure in said at least one pressure chamber.

7. An automatic hydraulic fluid device as claimed in claim 6 wherein said at least one inertia block member further comprises a center of gravity located in said another end portion between said at least one pivot pin member and the axis of said second cavity, whereby below said predetermined rotational speed of said drive pinion, said at least one inertia block member is biased by said spring member to slidably move said tubular slide member into said second predetermined position and above said predetermined rotational speed of the drive pinion, said at least one inertia block member, in response to said rotational speed of the pinion, moves said another end portion outwardly away from the axis of the camshaft to slidably move said tubular slide member into said first predetermined position.

8. An automatic hydraulic device as claimed in claim 7 wherein said hub member further comprises gear teeth mounted to the periphery of said hub member, said gear teeth further cooperatively engaging drive pinion of engine for rotation therewith.

9. An automatic hydraulic fluid device as claimed in claim 4 wherein said hub member further comprises portions defining at least another cavity disposed parallel and opposite to said at least one cavity, said at least another cavity with a central axis further being oriented perpendicular to the central axis of said camshaft, at least another passage parallel but opposite to said at least one passage, said at least another passage further communicating with said at least another cavity, said at least another passage further having an inner diameter, and wherein said device further comprises:

at least one another roller member connected to said hub member, said at least another roller member further being mounted diametrically opposite to said at least one roller member and mounted within said at least another passage, said at least another roller member having an outer diameter smaller than said inner diameter of said at least another passage to permit relative movement of said casing member to said hub member;

at least another piston member mounted within said at least another cavity, said at least another piston member having a front face, a rear face opposite to said front face, a biasing ramp on the periphery of said at least another piston adjacent to said front face and a central axis projecting from said rear face to said front face, said biasing ramp of said at least another piston member further being oriented contiguous to said at least another roller member for cooperative engagement therewith, said rear face of said at least another piston member and the bottom of said at least another cavity defining at least another pressure chamber;

at least another pivot pin member mounted to said hub member diametrically opposite to said at least one pivot pin member;

at least another inertia block member mounted to said at least another pivot pin member, said at least another inertia block member having one end portion and another end portion mounted contiguously to said one end portion, said one end portion operatively engaging said at least another piston member;

a second spring member interposed said at least another piston member and said one end portion of said at least another inertia block member; and means, connecting said annular passage and said at least another cavity, for flow communication therebetween.

10. An automatic hydraulic fluid device as claimed in claim 9, further comprising at least another biasing member connecting said hub member to said casing member, said at least another biasing member further biasing said biasing ramp of said at least another piston member in engagement with said at least another roller member.

* * * * *

UNITED STATES PATENT AND TRADEMARK OFFICE

CERTIFICATE OF CORRECTION

PATENT NO. : 4,401,088

DATED : August 30, 1983

INVENTOR(S) : Rene Morin

It is certified that error appears in the above-identified patent and that said Letters Patent is hereby corrected as shown below:

Column 2, line 13, after "is" insert a comma ---- , ----.

Column 3, line 44, before "have" insert ---- each ----.

Column 4, line 43, delete "a", first occurrence and insert ---- the ----.

Column 5, line 10, before "inertia" insert ---- the ----.

Column 8, line 21, before "drive" insert ---- said ----.

Column 8, line 22, before "engine" insert ---- said ----.

Signed and Sealed this

*Fourteenth* Day of *February 1984*

[SEAL]

*Attest:*

GERALD J. MOSSINGHOFF

*Attesting Officer*

*Commissioner of Patents and Trademarks*